(12) United States Patent
Chheda et al.

(10) Patent No.: US 6,515,975 B1
(45) Date of Patent: Feb. 4, 2003

(54) FAST FORWARD POWER CONTROL DURING SOFT HANDOFF

(75) Inventors: Ashvin Chheda, Dallas, TX (US); Ahmad Jalali, San Diego, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/296,974

(22) Filed: Apr. 22, 1999

(51) Int. Cl.[7] .................................................. H04Q 7/00
(52) U.S. Cl. ........................ 370/332; 370/318; 370/320; 370/330; 370/331; 370/335; 370/350; 370/503; 455/522; 455/442; 455/69
(58) Field of Search ................................. 370/318, 320, 370/322, 329, 330, 331, 332, 333, 335, 342, 350, 441, 503, 347, 378, 311; 455/522, 69, 456, 442

(56) References Cited

U.S. PATENT DOCUMENTS

| | | | | |
|---|---|---|---|---|
| 5,771,451 A | * | 6/1998 | Takai et al. ................. | 370/332 |
| 5,862,453 A | * | 1/1999 | Love et al. ................. | 370/335 |
| 5,963,870 A | * | 10/1999 | Chheda et al. .............. | 455/432 |
| 6,073,025 A | * | 6/2000 | Chheda et al. .............. | 370/332 |
| 6,119,005 A | * | 9/2000 | Smolik ....................... | 370/320 |
| 6,151,508 A | * | 11/2000 | Kim et al. .................. | 455/13.4 |
| 6,154,659 A | * | 11/2000 | Jalali et al. ................. | 455/522 |
| 6,160,999 A | * | 12/2000 | Chheda et al. .............. | 370/320 |
| 6,188,678 B1 | * | 2/2001 | Prescott ...................... | 370/318 |
| 6,253,085 B1 | * | 6/2001 | Bender ........................ | 370/331 |
| 6,304,562 B1 | * | 10/2001 | Kim et al. .................. | 370/332 |
| 6,305,210 B1 | * | 10/2001 | Saunders et al. ............ | 72/348 |
| 6,307,849 B1 | * | 10/2001 | Tiedemann, Jr. ............ | 370/332 |
| 6,351,650 B1 | * | 2/2002 | Lundby et al. .............. | 370/331 |
| 2001/0007552 A1 | * | 7/2001 | Schiff et al. ................. | 370/331 |
| 2001/0030948 A1 | * | 10/2001 | Tiedmann .................... | 370/305 |
| 2002/0002057 A1 | * | 1/2002 | Blanc .......................... | 455/522 |
| 2002/0018453 A1 | * | 2/2002 | Yu et al. ...................... | 370/333 |

* cited by examiner

Primary Examiner—William Trost
Assistant Examiner—Marcos Torres
(74) Attorney, Agent, or Firm—Carr Law Firm, L.L.P.

(57) ABSTRACT

Disclosed is an apparatus for and method of increasing the stability of a CDMA cellular system using fast forward power control. This is accomplished by improving the relative power level synchronization of all the BTSs communicating with an MS in a handoff mode through the use of at least one of 1) setting the power levels of any BTS other than the BTS having the best measured $E_b/N_o$ (bit energy to noise density) of reverse link FPC (forward power control) bit stream transmissions from said MS, hereinafter BTS(x), to a power level which is a function of the power level of BTS(x), 2) adjusting at least one of lower and upper limits of traffic channel gain of a BTS as a function of whether or not said given MS is in a handoff mode and 3) adjusting at least one of the incremental FPC (forward power control) and RPC (reverse power control) parameters as a function of the number of BTSs in a soft handoff mode with respect to said MS.

15 Claims, 2 Drawing Sheets

FAST FORWARD POWER CONTROL DURING SOFT HANDOFF

TECHNICAL FIELD

The present invention relates in general to wireless communication systems and in particular to an efficient method of and apparatus for improving the implementation of fast forward power control during soft handoff.

BACKGROUND

In a CDMA (code division multiple access) cellular system complying with an industry standard specification as set forth in IS-95A, the repetition rate of the forward link power control signals is slow, on the order of 50 Hz. The MS (mobile station) reports the status of the forward link frames to the SBS (selector bank subsystem) of a BSC (base station controller) via the entire set of BTSs (base station transceiver subsystems) in soft handoff with the MS. Based on the frame quality, the power control algorithm, as implemented by the SBS, determines the new transmit power levels for all the BTSs in soft handoff with the MS. The SBS relays the new transmit power levels to the BTSs. Hence, the power level used by each BTS in soft handoff with the MS is always equal. That is, the forward link power allocated to the MS at each of the BTSs is always synchronized to the same power level.

When a forward link frame is transmitted to the MS from the BTSS, it takes a finite amount of time before the MS receives it. If a communication mode designated as Rate Set 2 is employed, then the MS encodes an EIB (Erasure Indicator Bit) into the next outgoing reverse link frame, signifying the status of the forward link frame. After additional propagation delays, each BTS in soft handoff with the MS relays the demodulated reverse link frame and associated frame quality metrics to the SBS. The SBS then updates the forward transmit power levels of the forward link based on the EIB and instructs the BTSs to use the new level. Therefore, the time between the transmission of a forward link frame and the corresponding increase/decrease in transmit power is a constant delay. The delay is based upon the architecture (propagation/processing delays of the various interconnecting blocks) of the system. In rate set 1, on the other hand, the power control is accomplished through the use of the reverse link "Power Measurement Report Message" (PMRM), which is triggered by a count of the number of bad forward link frames.

The fact that the power control process is slow implies that under certain channel conditions, specifically low speed movement of the MS and single multipath environments where long deep fades are expected, a high average forward transmit power is required to meet a given GOS (grade of service).

An evolution of CDMA, popularly designated as 3G (third generation), includes a fast forward link power control scheme wherein the MS determines whether or not it requires more forward link power to maintain the GOS. The decision is transmitted rapidly to the BTSs via a reverse link dedicated control channel.

With the introduction of fast forward link power control, there was the expectation that forward link capacity would increase by large amounts at low mobile velocities. However, all the published analyses, known to the present inventors, carried out to characterize the actual capacity gain have failed to consider the performance of the algorithm during soft handoff. The term "soft handoff" throughout the remainder of this document is intended to define the situation where an MS is in communication with two or more BTSs preparatory to the potential of being transferred from one cell to another. The independence of the reverse links during soft handoff, in terms of slow/fast fading and distance/antenna related path losses to the mobile, result in different raw bit error rates. Individual BTSs that are in soft handoff, rapidly control their transmit power based on the forward power control bits they demodulate from the reverse link. This may, and often does, result in a deviation in instantaneous transmit power at the different BTSs. Depending on the degree of soft handoff, the average path loss difference between mobile and BTSs, and the power control parameters used, the resulting required forward link transmit power for a user may be quite high due to this mismatch. This translates to capacity degradation.

The main conclusion that may be drawn from the above, is that, to understand the practical effects of fast forward power control on capacity, one must consider the fact that an MS may be in a soft handoff mode for a significant amount of time. During this time, there is substantial opportunity for the transmission power levels of the different BTSs in soft handoff with the MS to become substantially non-synchronized. Additionally, one or more soft handoff forward links may be inadequately controlled due to poor reverse links. Such a situation detrimentally affects the potential capacity of such a system.

A CDMA system using fast forward link power control is more fully disclosed and discussed in one of several co-pending patent applications, such as "FAST FORWARD LINK POWER CONTROL IN A CODE DIVISION MULTIPLE ACCESS SYSTEM," filed Sept. 17, 1997, having application Ser. No. 08/932,093, to Chheda et al, and assigned to the same assignee as the present invention. This application is hereby incorporated into this document in its entirety by reference.

To realize the fast forward power control technique, the MS estimates the SNR (signal to noise ratio) per power control group after maximally ratio combining the received signal energy per multipath. The estimation is compared to a threshold and, based on the comparison, a power control, up or down, command is generated. The MS adjusts this SNR threshold every frame, or at 50 Hz, based on the quality of forward link frames. Each time a forward link frame is received in error, the threshold is increased. This represents situations where the SNR may be insufficient for the current mobility conditions. If the forward link frame is good, the SNR threshold is reduced. This is based on the assumption that the SNR is sufficient for the given GOS levels. The increase and decrease of the threshold are related by a FER (frame error rate) requirement. The up/down decisions are the control mechanism that ensures that the received SNR or the forward link is equal to the threshold.

During soft handoff, the different BTSs, of a 3G fast power control system, must now independently demodulate the MS power control decisions. Based on the demodulated decision, the BTS will increase/decrease its transmitted power. It is quite likely that the reverse links between the MS and the different BTSs will have different instantaneous power control bit error rates. Consequently, the actual decision that each BTS makes may not be the same. In other words, some BTSs may demodulate the power control bit decision in error. With the existing prior art network architecture, the BSC cannot synchronize the BTSs to the same power level after each power control decision because of the inherent processing and queuing delay of the central processing unit and interconnecting communication links.

If the reverse links from MS to BTSs were error free, then the transmitted power at each BTS per power control group time segment would be equal and perfectly synchronized. However, as mentioned above, each BTS to MS reverse link is likely to have a different instantaneous error rate due to the independent slow/fast fading, and different distance/antenna related path losses. Thus, if each link has a different error rate, then the actual transmitted powers from each BTS to MS during soft handoff deviate. This may result in loss of diversity. This is further explained via a possible scenario discussed below.

It may be assumed that the MS is in two-way soft handoff with the network. If the BTSs could be perfectly synchronized, then they would power up/down together. Hence, the diversity gain is optimized; when one path fades, the other is used and the reverse scenario also holds. In practice, even when the BTSs start out at the same level transmitted power level, due to different power control bit error rates per reverse link, their transmit power levels and up/down decisions are no longer perfectly synchronized. Typically, one reverse link will have a much higher FER and BER (raw bit error rate) than the other reverse link. If the MS requires lower forward power, then one BTS will power down quickly and appropriately, while the other may well remain at the same power level (if the raw BER is 50%), or power down at a much slower rate. Stability is usually maintained in such cases. Stability, for the purposes of this document, means that the FER requirements are maintained and the call drop rates are not increased. Since one BTS is not powering down, the other will power down to a lower level than it would if both links were adequately controlled. This ensures that just enough signal energy is provided to maintain GOS.

However, the converse is equally probable. Once the forward link is insufficient to a meet a given GOS, only the BTS with the more accurate reverse link will be able to react faster and more accurately by increasing its transmit power. Therefore, the resulting BTSs power levels are likely to be significantly different. The diversity gain is affected as a function of the difference between these levels. In other words, the forward link associated with the weaker reverse link is unable to provide diversity gain due to its inability to increase its transmit power. Thus, the overall requirement on power is higher in order for the adequately power controlled link to make up for the loss of diversity. Even if the weaker reverse link improves, the BTSs remain out of synch by an indeterminate factor as they adjust their powers up or down. If the other reverse link corrupts, the mismatch may increase or narrow.

It is important to keep in mind that while the higher reverse bit error rate on one link causes the traffic channel transmit power from one BTS to be much lower, the MAI (multiple access interference) that the BTS contributes at the MS receiver may still be high since, for the purposes of this discussion, it is assumed that the MS is in a soft handoff region. Thus the benefits of diversity cannot be realized. The overall effect is a reduction in system capacity. In fact, as the order of soft handoff goes up, this effect is more noticeable. Therefore, the soft handoff gain/benefit is compromised.

It may be noted that even if the MS were in a high order soft handoff and each link had independent 5% error rates, the traffic performance would still remain stable. This is because the forward powers of each BTS would not gravitate far apart. The problem is due to the fact that the error rates are "bursty". By the term "bursty", we mean that there are spurts of reverse link power control bit errors. Even though the overall reverse power control bit error rates are at 5%, one reverse link rate may have a power control bit error rate as low as a fraction of a percent, but occasionally go through error rate periods on the order of 20% to 30%. This causes the forward link power levels to significantly drift apart at each BTS, thereby resulting in a loss of diversity.

Finally, the overall power control coupling between forward and reverse link needs to be considered. If the MS is in a higher order soft handoff, and there is a poor forward link quality from a number of BTSs, the MS is more likely to make wrong reverse link power control decisions, and its general trend is to power down (lower the output transmitted power). This will in turn affect the power control bit rate and forward link frame quality, which further degrades the reverse link power control process. Eventually all forward link power control bits carried on the all the reverse links may thus be in error.

It would thus be desirable to find a way to improve the reverse link reliability during soft handoff, to ensure that such situations are minimized. It should be noted that there are practical issues, concerning present hardware and network limitations and standards, with synchronizing fast, that make rapid BTS power level synchronization a non-viable option at this time due to present day technology limitations and industry accepted standards. It is thus believed that a methodology is needed that synchronizes slowly and at regular intervals. Consequently, appropriate power control parameter selection, as a function of the state of soft handoff, is believed to be a prime factor in preventing capacity degradation.

SUMMARY OF THE INVENTION

The present invention comprises a method of improving the relative power level synchronization of all the BTSs communicating with an MS in a handoff mode through the use of at least one of 1) synchronizing all the handoff BTSs to the power level of the BTS having the best measured $E_b/N_o$ (bit energy to noise density) of reverse link transmissions, 2) adjusting at least one of lower and upper limits of traffic channel gain of a BTS as a function of handoff mode and 3) adjusting at least one of the incremental FPC (forward power control) and RPC (reverse power control) parameters as a function of the number of BTSs in a soft handoff mode.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

Figure 1:
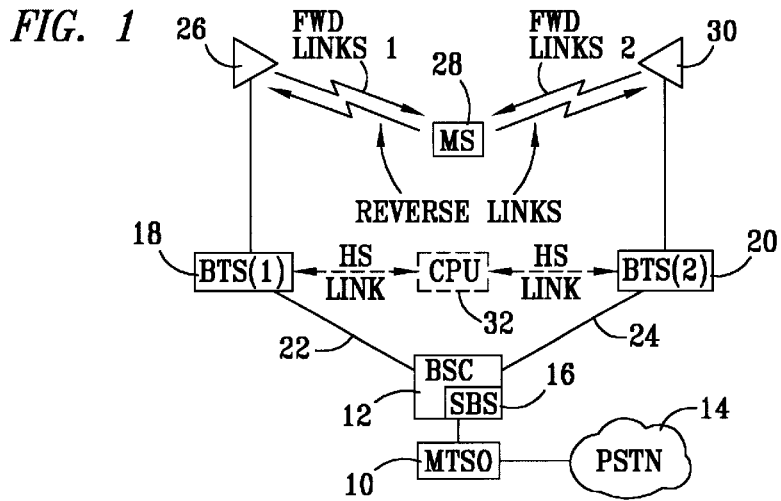
FIG. 1 is a block diagram of a cellular system used in describing the operation of the invention.
Figure 2:
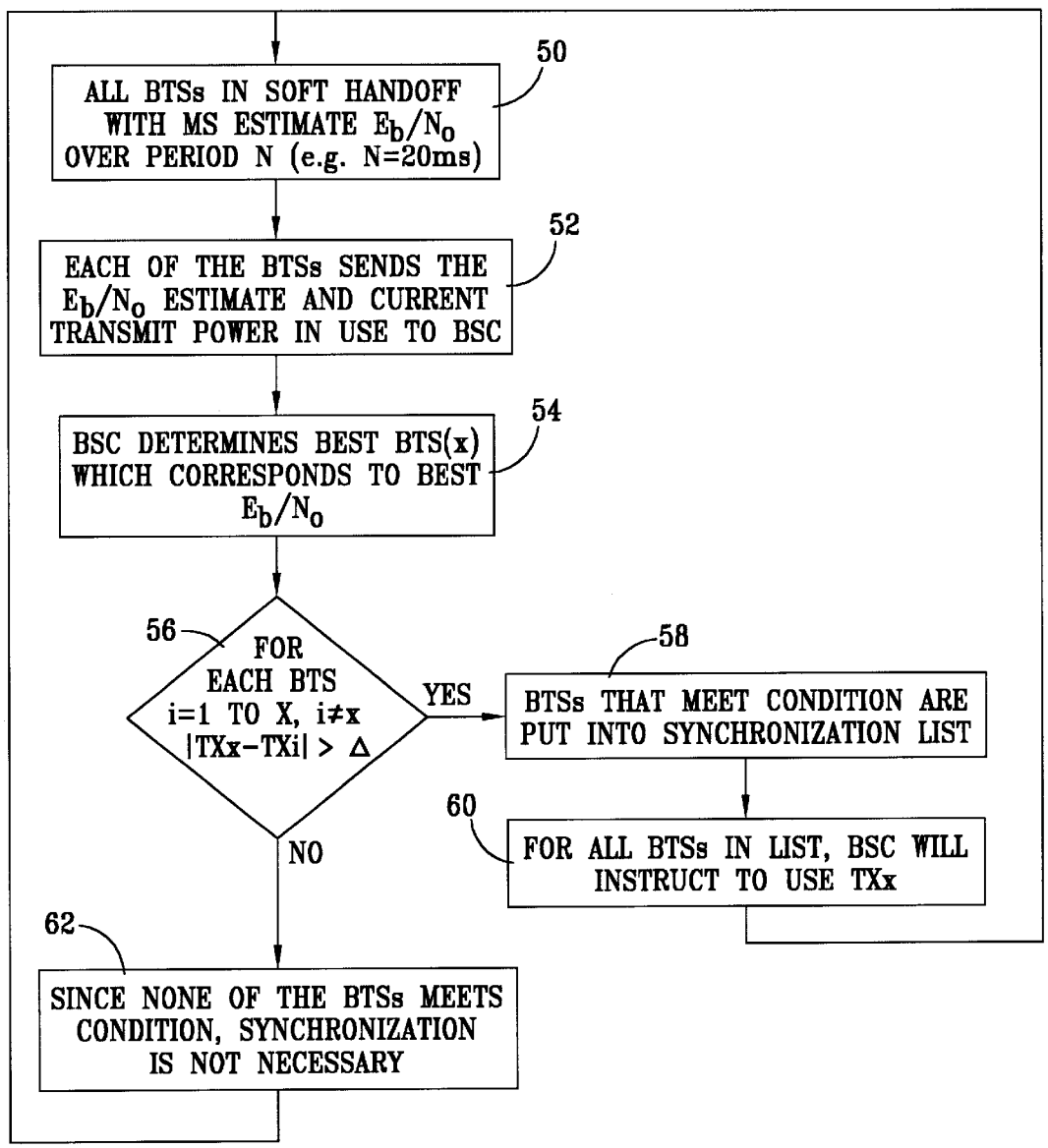
FIG. 2 is a flow diagram showing one of the inventive aspects of the present invention.

In FIG. 1, an MTSO (mobile telephone switching office) block 10 is connected to a BSC (base station controller) block 12 as well as to a cloud labeled PSTN (public switched telephone network) 14. Within block 12 there is shown an SBS (selector bank subsystem) block 16. First and second BTS blocks 18 and 20 are connected to BSC 12 by communication links 22 and 24 respectively. An antenna 26 of BTS 18 is shown transmitting forward link signals to an MS (mobile station) 28. Reverse link, part of which is the power control channel signals, are being returned from MS 28 to the antenna 26. A further antenna 30 for BTS 20 is also shown sending forward link signals to MS 28 and receiving reverse power control channel signals. A dash line CPU (central processing unit) block 32 is included as an alternative computational that may be used instead of the BSC 12. This is presented with high speed links connected from each BTS involved. In such an implementation, a BTS may be designed to use a centralized CPU when such a unit is detected but use a BSC as a default processor. In FIG. 2 a block 50 sets forth the requirement that all BTSs in a soft hand off mode with an MS estimate $E_b/N_o$ (bit energy to noise density), over a period "N". At present, a data frame is generated over a time period of 20 ms (milliseconds) and thus comprises an appropriate time period for N. The process then continues with block 52 where each of the BTSs sends the $E_b/N_o$ estimate and current transmit power to a central location such as BSC 12 of FIG. 1. In a block 54, the BSC determines the "best BTS" which corresponds to BTS(x) having the best detected reverse link $E_b/N_o$. The process then proceeds to a decision block 56 where the absolute value of the incremental difference of the output power for each BTS with respect to BTS(x) is determined. If any BTS output powers incremental difference are found to exceed a predetermined threshold, these BTSs are put into a synchronization list in a block 58. In a block 60, each of the BTSs in the list are instructed to use the power output of BTS(x) (the best) and the process returns to block 50. If none of the BTSs exceed the prescribed incremental difference, the process passes to block 62 and from there returns to block 50.

Figure 3:
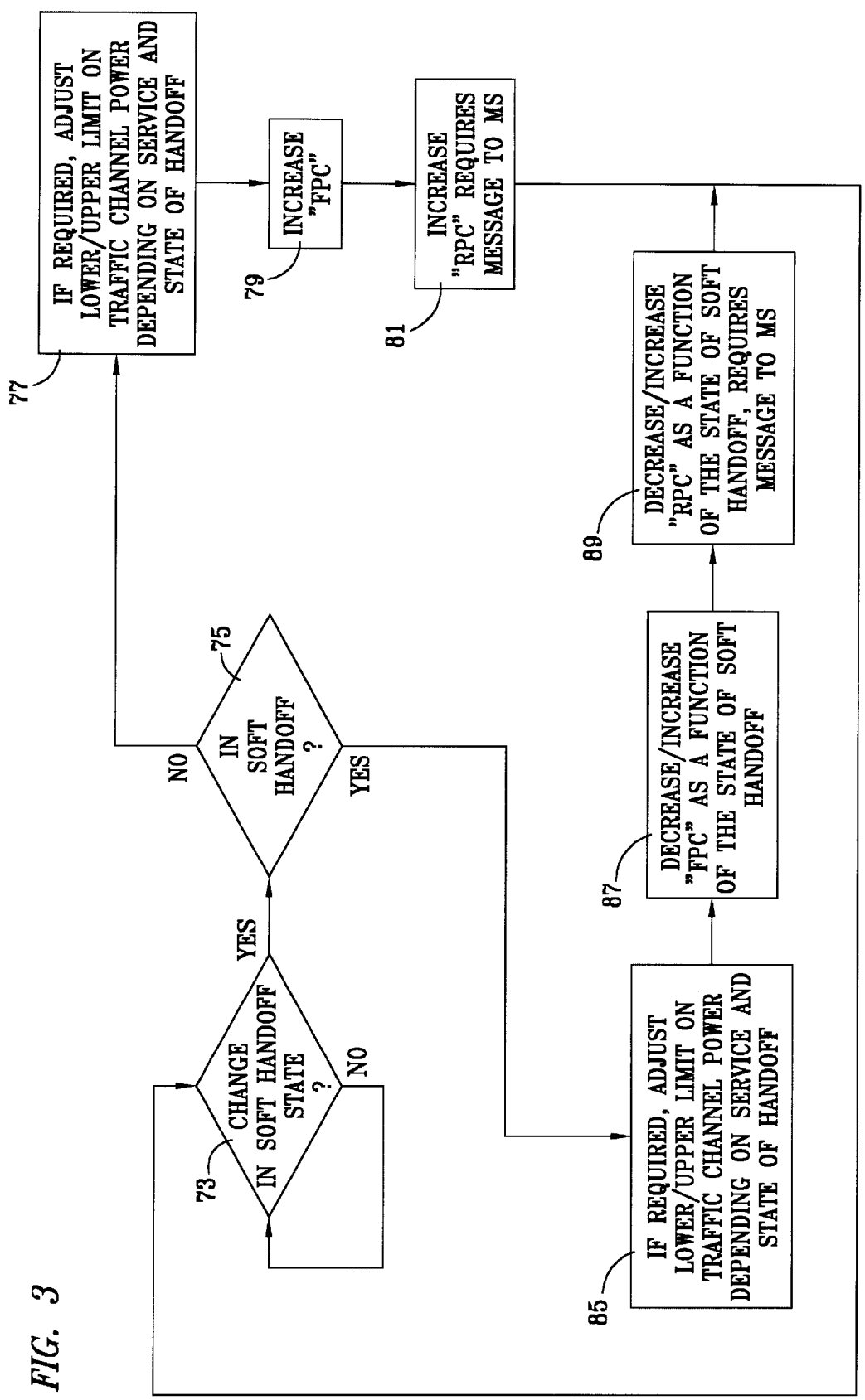
FIG. 3 is a flow diagram showing two additional inventive aspects of the present invention.

In FIG. 3, the process typically remains in a decision block 73 while checking to determine if there is a change in soft handoff state for each MS with whom the BTS is in contact. This change may be from no handoff to a handoff mode as well as from a handoff involving a plurality of BTSs to a different plurality of BTSs. Upon detection of a change of state, the process proceeds to a decision block 75. If the MS is no longer in soft handoff, the process goes to block 77 where the lower limit on traffic channel power may be adjusted downward in accordance with the system configuration. In some circumstances it may be desirable to adjust the upper limit at the same time. This upper limit may be altered either up or down. However, typically the range between upper and lower limits would be increased when an MS is not in a soft handoff mode. A next block 79 causes an adjustment (normally an increase) in the setting of an "fpc" (forward power control) increment. As used in this document, "fpc" is the amount by which the BTS would increase/decrease its power. As an example this alteration might be 1.0, 0.5 or 0.25 db. Then, in a block 81, a message is sent to the MS requesting an adjustment (normally an increase) in the "rpc" (reverse power control) increment. By definition herein, "rpc" is the amount by which the MS would increase/decrease its power in a manner similar to that mentioned above. In IS95A, the forward link is punctured every power control group with the decision in the form of bits, upon which the MS can make a hard decision. This invention operates similarly in 3G for "rpc" and "fpc". 3G CDMA also allow the use of separate channels to carry this rpc/fpc information. The process then returns to decision block 73 to await any further changes in soft handoff state.

If, in block 75, a determination is made that the BTS is now in a soft handoff state with respect to a given MS, the process advances to a block 85. In block 85, the lower limit on traffic channel power may be raised depending upon the present service conditions and the state of handoff. The upper limit may also be adjusted as mentioned above in connection with block 77. In a block 87, the incremental value of "fpc" may be increased or decreased depending upon the direction of change detected in decision block 73 and the numbers of BTSs presently involved in a soft handoff mode with the MS. In a like manner, a message is sent to the MS to either increase or decrease the "rpc" increment as a function of the state of soft handoff.

As indicated supra, we have determined that to provide maximum improvement in a cellular system using fast forward power control while in a soft handoff mode, several adjustments need to be made to system parameters some of which are a function of the number of BTSs involved in the soft handoff state.

As was explained briefly in the background section, the lack of power output level synchronization may cause loss of diversity of signals being sent from the BTS to an MS in a soft handoff mode. This is due to one or more BTSs changing transmission power levels inappropriately due to high reverse link bit errors. The end effect is a mismatch in transmitted power between the different BTSs. For instance, the strongest BTS in terms of instantaneous path loss may now be transmitting considerably less power than the other BTSs. Consequently, the other BTSs have to transmit even more power to make up for strong interference from the first BTS and loss of diversity.

Therefore, a logical approach is to solving this problem is to ensure that the mismatch is never too large. For instance, if the lower limit on transmit power is kept at a very low value without maintaining synchronization of BTS transmit power levels, it may be determined by experiment or testing that all the forward transmit power levels are much higher than is the case in perfect synchronization cases. This is because one or more BTS transmit levels drift and remain at levels far below the other BTS transmit levels, creating the referenced loss of diversity situation. In fact, due to system set upper limit cap on the transmit power, the remaining BTSs are likely to be unable to meet the GOS, (i.e. the resulting FER is far above the typically desired 1% set point).

Thus the block 77 in FIG. 3 provides the function of lowering the lower limit on traffic channel power in most situations where a BTS is not involved in a soft handoff mode with a given MS. This allows the MS get very close to the BTS without being overpowered by the BTS transmission signal and further allows the BTS to reduce its output signal to a low enough level that it will potentially increase its capacity to handle more traffic. The block 85, is the converse of block 77, in that normally the lower limit on the traffic channel of a BTS involved in a soft handoff mode will be raised so that it can not power down as far when the RPC messages in the reverse link are erroneously detected.

Although not specifically detailed above, it has further been determined that the step size of the FPC and RPC parameters have an affect on the stability of 3G CDMA systems when fast forward power control is implemented. The problem of too high an RPC when in soft handoff is already something that even affects existing IS-95A systems. When the MS is in high order soft handoff with the network, it is likely that one or more forward links are unreliable. In such situations, the MS may demodulate many of the reverse power control bits in error and actually start to power down. This is due to the way in which the rules have been established. As set forth in the standards, if even one power control bit is demodulated as down, the MS will power down (reduce the output transmission power level). It can only power up, if all the bits demodulated are demodulated as "power ups". Therefor, if the "rpc" increment is high, for instance 1.0 dB, then the MS could potentially power down in error very rapidly. Within 1 frame it may power down as much as 16 dB. If the "rpc" is lower, i.e. 0.25 dB, then the MS powers down 4 times slower. In one frame, it can only power down as much as 4 dB.

Due to selection diversity provided by multiple soft handoff legs and antenna diversity at the BTS receiver, a higher "rpc" increment will not buy any radical performance improvement. In fact, maintaining a lower "rpc, " step increment provides better reverse link reliability. In controlled tests, improved stability has been observed in IS95A type systems when the RPC step increment is lower in a soft handoff mode than a given RPC increment in a non-handoff mode.

Note that the reverse link stability ties directly with forward link stability when fast forward power control is operating. If the MS erroneously powers down by large amounts frequently, then the forward power control bits that it is supplying to the various BTSs are likely to go through higher bit error rates. This will affect the forward link stability. Once forward link stability is affected, it further affects reverse link quality. The end result is cyclical leading to degradation in system capacity.

During situations where the MS is in high orders of soft handoff with multiple BTSs, an even lower "fpc" increment has been determined to provide some benefit. If some of the BTSs make a wrong decision in demodulating the power control bit on the reverse link, they power down with a lower "fpc." Therefore, the differences in transmit power between the different BTSs do not gravitate apart as rapidly. A lower "fpc, " does not substantially affect forward link capacity, because the MS is in a high order of soft handoff, hence the overall fading of the combined multipath is not as deep as a single path scenario. Therefore, power controlling with 0.25 dB as opposed to 0.5 dB does not affect capacity performance significantly. There is an added benefit to using small step such as 0.25 dB in that a larger delay when synchronizing can be budgeted for. In other words a larger synchronization delay may be used because the BTS transmit powers do not move apart as rapidly.

As set forth above, it has been determined that when using a larger PRC step size, such as 0.5 dB, the reverse link has a higher probability of becoming unstable during higher orders of soft handoff. Any such reverse link instability leads to forward link instability. Hence, the forward link degradation is not due to improper synchronization but rather to the unstable reverse link. In simulation tests where the BTS output power levels has been synchronized and 0.25 dB step sizes have been used for "fpc" and "rpc", stability has been observed for all cases.

From the above, it is believed apparent that slow synchronization cannot, by itself, be used to solve the drifting apart of BTS transmit levels. Rapid synchronization can solve the drifting apart of BTS transmit levels, but at substantial cost to the network to actually facilitate such a feature. This invention thus uses appropriate power control parameters to prevent a large drift such that slow synchronization can be applied to correct for any drift that does occur. In this manner, the benefits of fast power control are achieved through the use of appropriately chosen parameters for different handoff situations.

An algorithm for dealing with the above parameter adjustments is shown in FIGS. 2 and 3. The power control parameter adjustment as function of soft handoff is presented in FIG. 2. FIG. 3 deals with slow synchronization to prevent an inadequately power controlled base station from settling to the lower or upper limits on the forward link transmit power.

While FIG. 3 is believed apparent from the above, it may be mentioned that, whenever the state of handoff changes, the parameters "fpc, " "rpc, " and the lower limit on traffic channel power are adjusted accordingly. If for instance the handoff increases to contain three or more BTSs, then a small step value for "fpc, " and "rpc" such as 0.25 dB may be used. If the soft handoff involves less than 3 BTSs, then a larger step value for "fpc, " and "rpc" such as 0.5 dB may be used. Similarly, the lower limit of traffic channel gain may be lowered in situations where there is no soft handoff, and increased when the MS is in soft handoff. The only message required, is one that instructs the MS to adjust "rpc."

Referring now to FIG. 2, in block 50 it shows that the BTSs measure $E_b/N_o$ over a period N, for instance 1 frame, and then transmit the measurement obtained along with the instantaneous traffic channel transmit power whenever it is in soft handoff as set forth in block 52 to a central location such as the BSC. Circuitry within the BSC, as shown in block 54, may be used to determine the BTS with the most reliable reverse link, hence the BTS which is likely to be the one most reliably power controlled. In decision block 56, the BSC compares the transmit levels of the other BTSs with this BTS(x) and based on the comparison determines if their transmit powers need to be adjusted. If any of the BTSs need to be adjusted, for instance maybe one or more BTSs are sitting at the lower limit, or upper limit, the process continues to blocks 58 and 60 where the BSC compiles a list and sends messages instructing these BTSs to use a new transmit level. This transmit level is the level that was sent to it by the most reliable BTS(x). In most situations, the BTSs will not need synchronization and the process returns through block 62 to block 50. However the part of the process set forth in FIG. 2 is used as a safety check to ensure that BTSs are not sitting at the lower/upper limits of traffic channel transmit power.

It has been determined empirically, that, whenever the MS is not in soft handoff, the transmit power levels of a BTS, where a MS is receiving multipath signals due to topographic signals reflections, were much lower than occurred in single path cases. The degree of transmit power level difference is dependent on the speed of movement of the MS. However, in cases of soft handoff, it has been determined that the transmit power level difference depends on the power control scheme employed. With the fast power control cases, the forward link power requirement in the two multipath case was higher when in 3 way soft handoff and above. This is due to dispersed power effects. These determinations were made with equipment having only three RAKE fingers at the MS. Three RAKE fingers are typical in an MS, hence much of the multipath cannot be used for maximal ratio combining though it contributes to interference. In the slow power control simulations, the gain during no handoff situations is so large, that it makes up for dispersed power effects in higher handoff situations. However, for two and some three way handoff, the diversity gain is larger than the dispersed power impacts, and so the required power is still marginally less in the two multipath case. The end result is a reduction in the forward link average transmit power requirements.

As a summary of the above, we have determined that the lower limit on traffic channel transmit power needs to be adequately set. Too low a value impacts capacity by necessitating the need for rapid synchronization. Too high a value also impacts capacity by resulting in higher than required transmit power levels for a given GOS. We have also determined that a lower value of power adjustment should be used when the MS is in high orders of soft handoff. This reduces the standard deviation of both the forward and reverse transmit power errors, thereby enabling stable performance of the system. In conjunction with the above, slow synchronization provides some marginal gain improvement. Accordingly, circuitry in the BSC is used to slowly rectify transmit power levels of some of the BTSs in soft handoff of the MS.

Although the invention has been described with reference to specific CDMA system embodiments, these descriptions are not meant to be construed in a limiting sense. Various modifications of the disclosed embodiments, as well as alternative embodiments of the invention, will become apparent to persons skilled in the art upon reference to the description of the invention. It is therefore, contemplated that the claims will cover any such modifications or embodiments that fall within the true scope and spirit of the invention.

What is claimed is:

1. A cellular communication system incorporating fast forward power control and having at least 2 BTSs (base transceiver stations), a BSC (base station controller and an MS (mobile station) comprising:

measuring means, comprising a part of each BTS in the system, for measuring the $E_b/N_o$ (bit energy to noise density), at each BTS that is receiving reverse link transmissions from an MS, of reverse link FPC (forward power control) bit stream transmissions from said MS;

BSC comparison means for periodically comparing the measured $E_b/N_o$ to determine, during the time when an MS is in a handoff mode, which BTS is receiving the most reliable FPC data wherein the BTS determined to be is receiving the most reliable FPC data is designated hereinafter as BTS(x);

further BSC comparison means for comparing the transmit power level of each BTS, other than BTS(x), with the transmit power level of BTS(x);

BSC instructing means for instructing each BTS, other than BTS(x), whose power level differs from the transmit power level of BTS(x) by more than a predetermined value, to adjust the power level of transmissions to said MS to the level of BTS(x);

BSC checking means for determining the number of BTSs in a soft handoff mode with respect to a given MS; and means for adjusting at least one of the incremental FPC, RPC (reverse power control) parameters and the lower limit of traffic channel gain as a function of the number of BTSs in a soft handoff mode with respect to said MS.

2. A method of attempting to synchronize BTS (base transceiver station) transmit powers of a cellular communication system to an MS (mobile station) when there are at least 2 BTSs listed in an active set of said MS comprising the steps of:

measuring the $E_b/N_o$ (bit energy to noise density), at each of the BTSs listed in the active set of said MS, of reverse link FPC (forward power control) bit stream transmissions or pilot bit stream transmissions from said MS;

periodically comparing the measured $E_b/N_o$ to determine which BTS is receiving the most reliable FPC data; and instructing one or more active set BTSs, other than the BTS determined to be receiving the most reliable FPC data, to adjust the power level of transmissions from each of the one or more active BTSs to said MS to the level of the BTS determined to be receiving the most reliable FPC data from said MS.

3. A method of attempting to synchronize BTS (base transceiver station) transmit powers of a cellular communication system to an MS (mobile station) when there are at least 2 BTSs receiving reverse link transmissions from said MS comprising the steps of:

measuring the $E_b/N_o$ (bit energy to noise density), at each of the BTSs receiving reverse link transmissions from said MS, of reverse link FPC (forward power control) bit stream transmissions or pilot bit stream transmissions from said MS;

periodically comparing the measured $E_b/N_o$ to determine which BTS is receiving the most reliable FPC data; and instructing each BTS, other than the BTS determined to be receiving the most reliable FPC data, to adjust the power level of transmissions to said MS to the level of the BTS determined to be receiving the most reliable FPC data from said MS.

4. A method of attempting to synchronize BTS (base transceiver station) transmit powers of a cellular communication system to an MS (mobile station) when there are at least 2 BTSs receiving reverse link transmissions from said MS comprising the steps of:

measuring the $E_b/N_o$ (bit energy to noise density), at each of the BTSs receiving reverse link transmissions from said MS, of reverse link FPC (forward power control) bit stream transmissions from said MS;

periodically comparing the measured $E_b/N_o$ to determine which BTS is receiving the most reliable FPC data wherein the BTS determined to be is receiving the most reliable FPC data is designated hereinafter as BTS(x);

comparing the transmit power level of each BTS, other than BTS(x), with the transmit power level of BTS(x); and instructing each BTS, other than BTS(x), whose power level differs from the transmit power level of BTS(x) by more than a predetermined value, to adjust the power level of transmissions to said MS to the level of BTS(x).

5. A method of adjusting power control parameters in a cellular communication system comprising the steps of:

determining the number of BTSs (base transceiver stations) in a soft handoff mode with respect to a MS (mobile station); and adjusting at least one of the incremental FPC (forward power control) and RPC (reverse power control) parameters as a function of the number of BTSs in a soft handoff mode with respect to said MS, wherein the power control parameters comprise part of a fast forward power control function of the BTSs.

6. A method of adjusting power control parameters in a cellular communication system comprising the steps of:

determining the number of BTSs (base transceiver stations) in a soft handoff mode with respect to a MS (mobile station); and adjusting at least one of the incremental FPC (forward power control) and RPC (reverse power control) parameters as a function of the number of BTSs in a soft handoff mode with respect to said MS, wherein the adjusting function comprises reducing the incremental value of FPC as the number of BTSs in a soft handoff mode with respect to said MS increases.

7. The method of claim 5 comprising the additional step of comprising the additional step of:

lowering a lower limit of traffic channel gain of a BTS (base transceiver station) as regards communications with a given MS (mobile station) when said given MS is not in a handoff mode.

8. The method of claim 5 comprising the additional step of:

adjusting the range between upper and lower limits of traffic channel gain of a BTS (base transceiver station) as regards communications with a given MS (mobile station) as a function of whether or not said given MS is in a handoff mode.

9. The method of claim 5 comprising the additional step of:

raising a lower limit of traffic channel gain of a BTS (base transceiver station) as regards communications with a given MS (mobile station) when said given MS is in a handoff mode as compared to the lower limit of the traffic channel gain of the BTS when said given MS is not in a handoff mode.

10. The method of claim 5 comprising the additional step of:

adjusting a lower limit of traffic channel gain of a BTS (base transceiver station) as regards communications with a given MS (mobile station) as a function of whether or not said given MS is in a handoff mode.

11. A cellular communication system incorporating fast forward power control and having at least 2 BTSs receiving reverse link transmissions from a MS (mobile station) comprising:

measuring means, comprising a part of each BTS in the system, for measuring a parameter, at each of the BTSs receiving reverse link transmissions from said MS, of reverse link FPC (forward power control) bit stream transmissions from said MS;

comparison means for periodically comparing the measured parameter to determine which BTS is receiving the most reliable FPC data wherein the BTS determined to be is receiving the most reliable FPC data is designated hereinafter as BTS(x);

further comparison means for comparing the transmit power level of each BTS, other than BTS(x), with the transmit power level of BTS(x); and instructing means for instructing each BTS, other than BTS(x), whose power level differs from the transmit power level of BTS(x) by more than a predetermined value, to adjust the power level of transmissions to said MS to the level of BTS(x).

12. Apparatus as claimed in claim 11 where the parameter measured is $E_b N_o$ (bit density).

13. The method of claim 4, wherein each BTS, other than BTS(x), whose power level differs from the transmit power level of BTS(x) by more than a predetermined level, is instructed to synchronize the power level of transmissions to the level of BTS(x).

14. The method of claim 11, wherein the instructing means instructs each BTS, other than BTS(x), whose power level differs from the transmit power level of BTS(x) by more than a predetermined value, to synchronize the power level of transmission to said MS to the level of BTS(x).

15. The method of claim 2, wherein the instructing step further comprises instructing all active set BTSs, other than the BTS determined to be receiving the most reliable FPC data, to adjust the power level of transmissions from all active BTSs to said MS to the level of the BTS determined to be receiving the most reliable FPC data from said MS.

* * * * *